Dec. 26, 1922.                                    1,440,027.
K. NOSSAGK.
DEVICE FOR MAKING REENFORCING WEB.
FILED JAN. 15, 1921.

INVENTOR:

Kurt Nossagk.

Patented Dec. 26, 1922.

1,440,027

UNITED STATES PATENT OFFICE.

KURT NOSSACK, OF COTTBUS, GERMANY, ASSIGNOR TO THE FIRM P. STAUSS & H. RUFF, OF COTTBUS, GERMANY.

DEVICE FOR MAKING REENFORCING WEB.

Application filed January 15, 1921. Serial No. 437,509.

*To all whom it may concern:*

Be it known that I, KURT NOSSACK, a citizen of the German Empire, residing at Cottbus, Germany, have invented certain new and useful Improvements in Devices for Making Reenforcing Web, of which the following is a specification, for which I have filed applications in Germany on Apr. 18, 1915, and October 12, 1920.

My invention relates to the manufacture of a web or netting serving for filling and reenforcing plaster work on ceilings and walls and this more particularly to the kind in which each lease or weave or crossing is embedded in a button or other shape of clay, loam, cement or the like. Now when manufacturing such a filling net, the net and the plastic material (clay or loam, etc.) are caused to run conjointly between two pattern cylinders, and when the lease passes through the centre of the mould, at the point where the space between the cylinders is the narrowest, the button is moulded around it.

However, the plastic material which when filled into the mould always chokes to a certain extent, now tends to draw the threads into the mould, as a result of which according to the thickness of the thread and the width of the mesh, there will be produced a more or less considerable bulging, an irregular covering and, as a further consequence, a crumbling off of the weaker side.

This defect is remedied, in accordance with my invention, by the arrangement within the centre of each half or section of the mould of a stamp-like elevation which during the moulding operation acts as an abutment for the lease. By these means the threads, which in general are of wire, will now be prevented from being crushed and the envelop or cover thereon will become uniform. As a result, provided the width of the mesh remain the same as that used for filling webs of this type as hitherto known, a weaker wire may be employed than that hitherto customary or wherever it is preferred to use a wire of the same grade, then the filling webs may be made with a larger width of mesh, preferably one of 25 mm. instead of 20 mm. as up to the present. It will be readily understood, that by these means there will be secured a considerable saving in wire during the manufacture of the web. To conclude, the web need not be made of wire, but it may also be made of threads of any suitable kind.

An additional feature of my invention resides in the patterns being given a circular or ring-shaped outline by the pattern cylinders, so that buttons made in accordance with my invention will no longer possess a cross shape, as hitherto, but will have the shape of a disc or ring. By so shaping, both the filling web as also the pattern cylinders, the advantage is secured that the manufacture of the cylinders will henceforth be substantially simplified, in that the circular depressions formed therein may be made by drilling. As regards the stamp-like elevations arranged within the depressions they may be secured in a very simple manner by driving small pins or studs into the cylinders.

In the drawings affixed to this specification and forming part thereof, a device and product embodying my invention are illustrated by way of example. In the drawings, Fig. 1 is a plan of part of a pattern cylinder bearing the moulds for the buttons, Fig. 2 is a cross section of part of a pair of cooperating cylinders.

Fig. 3 is a plan view of a section of the finished article, while

Figure 1:
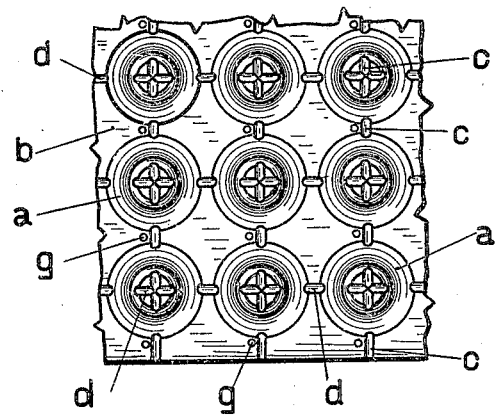

Referring to the drawings, $a$ are the cavities or dies formed in the upper surface of the cylinder $b$. In the centre of each cavity $a$ there is a raised portion $i$ which is either integral with the cylinder or may consist of a stud or pin inserted into the cylinder. The cylinders are in addition provided with grooves disposed at right angles to each other and intersecting at the raised or elevated points $i$, these grooves serve as guides for the threads of the web, the grooves $c$ being destined for the woof threads $e$ and grooves $d$ for the warp threads $f$. Additional pins $g$ arranged on the cylinders and adapted to lodge themselves in suitable holes $h$ formed in the counter cylinder, serve to take the web along in the course of the manufacturing process.

Figure 3:
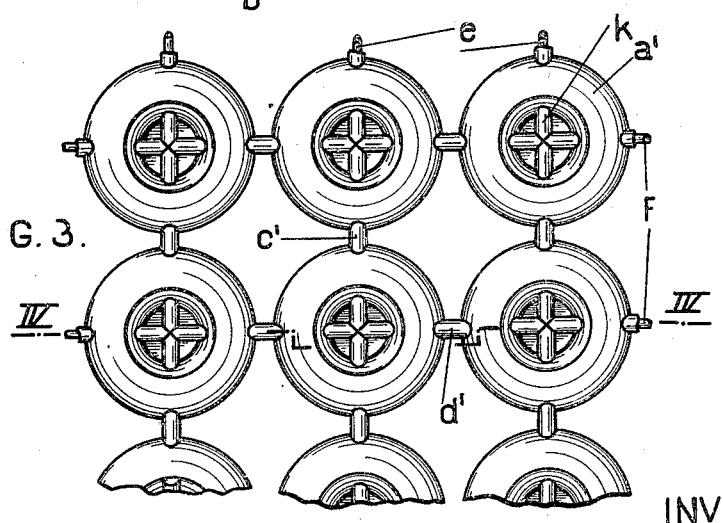
Figure 4:
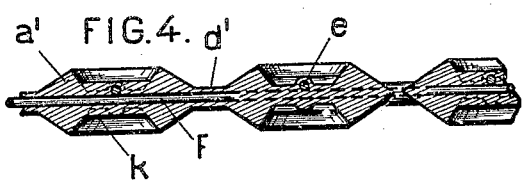
Fig. 4 is a cross section on line IV—IV in Fig. 3.

The stamp-like raised portions $i$ arranged within the depressions or cavities $a$ produce as shown in Figs. 3 and 4, crater or cup-shaped depressions $k$ in the buttons $a'$ and that on both sides thereof, notwithstanding the stamp-like elevated portions $i$ are only of such a height that the wires $e$ and $f$ will not be entirely uncovered within the buttons, but that above these wires there will still remain a thin layer of material. The crater-shaped depressions on both sides of the filling web increase the degree to which the plaster is supported and secured by the web in that when making the plaster surface, plaster will come to enter these depressions and will thus cause a short plug of mortar to be formed therein.

Figure 2:
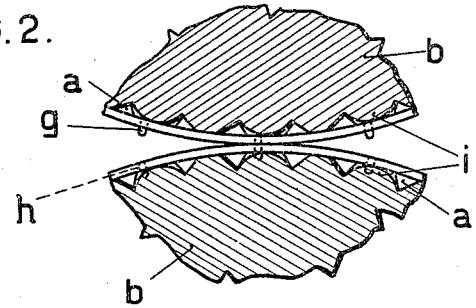

As shown in Figs. 3 and 4, the filling web made by aid of the cylinder disclosed in Figs. 1 and 2, is provided with buttons or other shaped bodies $a'$ made of burnt clay, loam, cement or the like, having the shape of a flat double cone truncated at both its sides, and provided on either face with the aforesaid cup-shaped depressions. When given their maximum circumference, these buttons or shapes will be so large, that they almost come to touch tubular connections $c'$, $d'$ of the same material as the buttons serving to cover the sections of the wires $e$ and $f$ disposed intermediate said buttons.

The term "button" as used in the appended claims is meant to comprise every kind of suitable shape adapted to serve the same purpose.

I claim:

1. In a tissue coating device in combination, a mould comprising a plurality of substantially cup shaped cavities in spaced relation to each other, thread engaging means between said cavities and intersectingly grooved, substantially knob shaped projections in said cavities.

2. In a tissue coating device in combination, a mould comprising a plurality of substantially circular cup shaped cavities spaced from each other, and intervening raised thread engaging portion between said cavities, and a substantially knob shaped superficially intersectingly grooved projection in said cavity of less height than the intervening raised portion.

3. In a tissue coating device in combination, a pair of cooperating confronting moulding rollers, a plurality of intercrossingly arranged rows of substantially cup-shaped adjacent disposed cavities on said rollers raised thread engaging portions intermediate the cavities of each roller and spaced from the thread engaging portions of the opposite roller, and a substantially knob shaped superficially intersectingly grooved projection in each cavity of less height than the thread engaging portions.

4. In a tissue coating device in combination, a pair of cooperating confronting moulding rollers, a plurality of intercrossingly disposed rows of substantially circular, cup shaped adjacently arranged cavities on said rollers, raised thread engaging portions between the cavities of each roller and spaced from the thread engaging portions of the opposite roller, and a substantially knob-shaped superficially intercrossingly grooved projection in each cavity of less height than the thread engaging portions and inter-engaging knob and socket members on one side of said raised thread engaging portions of the rollers.

5. In a tissue coating device in combination, a mould comprising a plurality of substantially circular cavities adjacently arranged, grooved thread engaging raised portions between said cavities, a substantially knob shaped rounded superficially intercrossingly grooved projection in each cavity and knob and socket members on one side of said thread engaging raised portions.

6. In a wire-tissue coating device in combination, a pair of confrontingly arranged cooperating moulds, a plurality of intercrossingly arranged rows of substantially circular cup shaped cavities in said moulds, raised thread engaging superficially grooved connecting portions between said cavities, and substantially rounded knob shaped superficially inter-crossingly grooved projections in said cavities of less height than said raised thread engaging portions, inter-engaging guiding pins and holes oppositely arranged at one side of said raised thread engaging portions.

In testimony whereof I affix my signature.

KURT NOSSAGK.